No. 705,141. Patented July 22, 1902.
W. H. RAUCH.
FRUIT PICKER.
(Application filed Dec. 21, 1901.)
(No Model.)
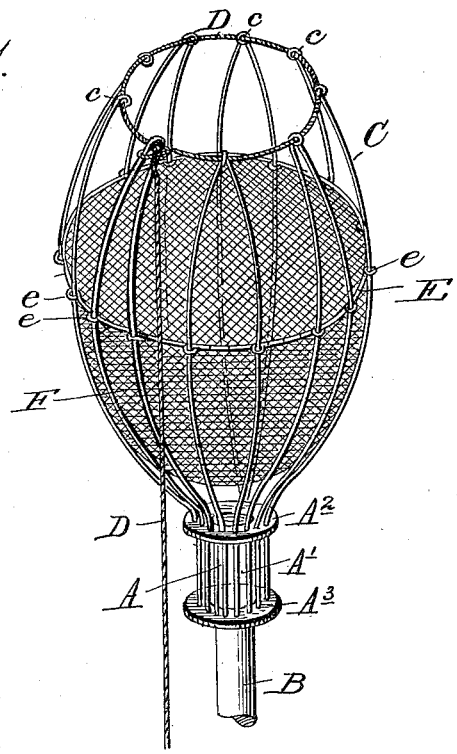
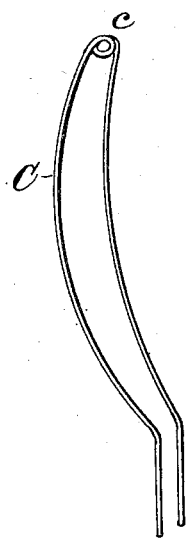
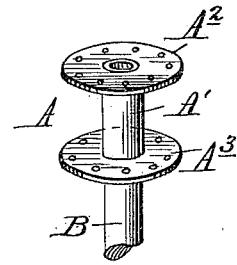
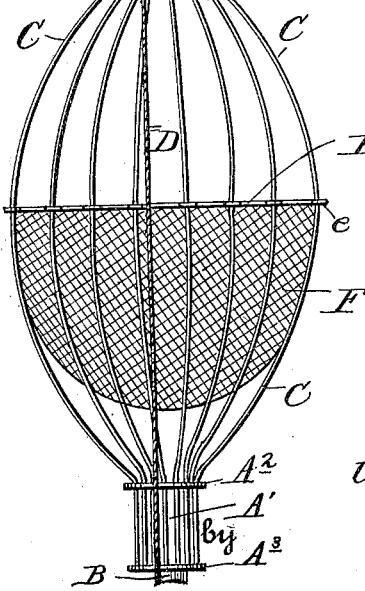
Witnesses
Franck L. Ourand.
A. P. Greely
Inventor.
William H. Rauch.
by Geo. H. Evans
Attorney

UNITED STATES PATENT OFFICE.

WILLIAM H. RAUCH, OF WICHITA, KANSAS.

FRUIT-PICKER.

SPECIFICATION forming part of Letters Patent No. 705,141, dated July 22, 1902.

Application filed December 21, 1901. Serial No. 86,840½. (No model.)

*To all whom it may concern:*

Be it known that I, WILLIAM H. RAUCH, a citizen of the United States, residing at Wichita, Sedgwick county, Kansas, have invented certain new and useful Improvements in Fruit-Pickers, of which the following is a specification.

The object of my invention is to provide a simple and inexpensive implement by means of which fruit may be picked from the tree by a hand-like operation, so that it will not be injured or bruised. This object I accomplish by the mechanism shown in the accompanying drawings, in which—

Figure 1 is a perspective of my improved picker with the fingers open. Fig. 2 is a side elevation with the fingers closed. Fig. 3 is a detail view of one of the fingers, and Fig. 4 shows the socket or shank of the picker.

A designates the shank or socket, formed of a short tube A', provided at its ends with apertured rings or flanges $A^2$ $A^3$.

B is the pole, fitting at its upper end in the tube or socket and made of any desired length.

C designates the fingers, each formed of a spring-wire bent upon itself and bowed outwardly, the lower straight ends of the wires extending down through and secured in the apertured rings or flanges. The fingers C are thus arranged in an annular series and spring apart at their upper ends, so as to allow the entrance of the fruit to be picked. At their upper ends the fingers C are provided with eyes c, formed by bending the wires. The operating-cord D is tied to one finger just below its eye, then passed through all the series of eyes to and through the eye on the finger to which its end is tied, and then down within reach of the operator. By pulling on the cord the fingers will be contracted around the fruit, as shown in Fig. 2. The finger to which the cord is tied is formed of heavier wire than the others, so that the mouth of the picker will close evenly when the cord is pulled. When the cord is released, the fingers will spring apart to their normal positions. About midway of their lengths the fingers C are connected by a ring E, to which they are secured in any desired manner, and this ring is preferably provided with eyes e, through which the finger-wires are passed.

F is a pocket formed of fabric of any suitable kind, such as netting, and suspended within the lower end of the picker by securing its upper open end to the ring E.

It will be seen that the device is exceeding simple and easily operated, and the fruit may be picked with a movement quite like that of the human fingers.

What I claim is—

1. A fruit-picker comprising, a socket having upper and lower fixed apertured rings or collars on its outer side, a circularly-arranged series of outwardly-bowed spring-fingers having straight lower ends mounted in the apertures in both rings or collars and provided at their upper ends with eyes, and an operating-cord passed through said eyes to contract the fingers around the fruit, substantially as set forth.

2. A fruit-picker, comprising a shank or socket provided with apertured rings or flanges at its ends, and a circularly-arranged series of spring-fingers each formed of a single wire bent upon itself, formed with an eye in its bend and having its lower ends passed through and secured to said apertured rings, and an operating-cord connected to said eyes to contract the fingers around the fruit.

3. A fruit-picker, comprising a socket, a series of bowed spring-fingers secured to the socket and having eyes at their upper ends; one of said fingers being of heavier material than the other, a cord secured to said heavier finger, thence passed through the eyes of the other fingers and finally through the eye of the heavier finger down to the operator.

4. A fruit-picker, consisting in the shank or socket, the bowed spring-fingers having eyes at their upper ends, a ring connecting the fingers between their ends, a sack or pocket suspended from said ring within the series of fingers, and a cord connected to the said eyes for contracting or closing the fingers.

In testimony whereof I affix my signature in presence of two witnesses.

WILLIAM H. RAUCH.

Witnesses:
MARIE WILLIAMS,
JACKSON F. RANDOLPH.